(12) United States Patent
Hergeth et al.

(10) Patent No.: US 6,403,729 B1
(45) Date of Patent: Jun. 11, 2002

(54) PROCESS FOR HETEROPHASE REACTIONS IN A LIQUID OR SUPERCRITICAL DISPERSION MEDIUM

(75) Inventors: Wolf-Dieter Hergeth, Julbach; Richard Becker; Mehmet Gunaltay, both of Emmerting; Herbert Jekat, Unterwoessen; Frank Rindfleisch, Koeln-Fuehlingen; Heribert Wendenburg, Winhoering, all of (DE)

(73) Assignee: Wacker Chemie GmbH, Munich (DE)

( * ) Notice: Subject to any disclaimer, the term of this patent is extended or adjusted under 35 U.S.C. 154(b) by 0 days.

(21) Appl. No.: 09/417,618

(22) Filed: Oct. 13, 1999

(30) Foreign Application Priority Data

Oct. 16, 1998 (DE) .......................... 198 47 822

(51) Int. Cl.⁷ ............................... C08F 2/08
(52) U.S. Cl. .............................. 526/68; 526/89
(58) Field of Search ..................... 526/68, 69

(56) References Cited

U.S. PATENT DOCUMENTS 3,829,478 A    8/1974   Ohorodnik et al.

FOREIGN PATENT DOCUMENTS

| DE | 855 239   | 11/1952 |
| DE | 1 091 998 | 11/1960 |
| DE | 2222950   | 12/1972 |
| EP | 0 159 021 | 9/1990  |
| GB | 1152766   | 5/1969  |

OTHER PUBLICATIONS

Derwent Abstract 1972—82371T [52] corresponding to DE 2222950.
Derwent Abstract 1895—265007 [43] dorresponding to EPO 0 159 021.
A.I. Cooper, J.M. DeSimone: Current Opinion in Solid State & materials Sciences 1 (1996) 6.
D.A. Canelas, J.M. DeSimone: Advances in Polymer Science 133 (1997) 103.
An English Abstract corresponding to DE 855239.
An English Abstract corresponding to DE 1091998.

*Primary Examiner*—David W. Wu
*Assistant Examiner*—William K. Cheung
(74) *Attorney, Agent, or Firm*—Brooks & Kushman P.C.

(57) ABSTRACT

The invention provides a process for heterophase reactions in a liquid or supercritical dispersion medium, in which the starting materials are introduced into the reaction zone of a reactor provided with one or more enrichment zones and the reaction product or unreacted starting material or both starting material and reaction product are discharged via one enrichment zone in each case, wherein a) the reaction product together with the dispersion medium is discharged from the reactor via an enrichment zone, the reaction product is separated off and the dispersion medium is, if desired in countercurrent to the reaction product/dispersion medium mixture and via an enrichment zone, returned to the reaction zone, or b) unreacted starting material together with the dispersion medium is discharged, the starting material is separated from the dispersion medium and returned directly to the reaction zone and the dispersion medium is, if desired, in countercurrent to the reaction product/dispersion medium mixture and via an enrichment zone, returned to the reaction zone, or the steps a) and b) are combined with one another.

3 Claims, 3 Drawing Sheets

PROCESS FOR HETEROPHASE REACTIONS IN A LIQUID OR SUPERCRITICAL DISPERSION MEDIUM

BACKGROUND OF THE INVENTION

1) Field of the Invention

The invention relates to a process involving heterophase reactions in a liquid or supercritical dispersion medium and also to an apparatus for carrying out the process.

2) Background Art

Heterophase reactions are chemical processes in which the reaction product is not soluble in the carrier medium but is obtained in finely divided form therein. They include not only precipitation reactions or crystallizations but, in particular, also heterophase polymerizations such as emulsion polymerizations, suspension polymerizations and dispersion polymerizations.

The starting mixture of a heterophase reaction can be either homogeneous or heterogeneous. Typical particle sizes for the reaction products of heterophase reactions are from 10 nm to a few millimeters. In most cases, unreacted starting materials have to be removed from the reaction mixture or the product after the reaction is complete. It is frequently also necessary to separate the finely divided reaction product from the reaction mixture. Heterophase reactions are usually carried out in closed stirred vessels or cascades of stirred vessels or in tube reactors. Here, both pure batch processes and semicontinuous or continuous processes are possible for the reactions.

Many of the starting materials used in heterophase reactions, in particular the monomers used in heterophase polymerizations, have a strong odor and are harmful to health. Stabilizers as well as, for example, initiator components or other polymerization auxiliaries often remain in the reaction product. This can lead to impairment of the use properties of the polymer. For this reason, these auxiliaries as well as, for example, oligomers or products of secondary reactions therefore have to be extracted from the reaction products in many cases.

Some of the substances separated from the reaction products, for example monomers or stabilizers, may, after a work-up step, be re-used in a later polymerization. This can reduce manufacturing costs and costs for disposal of waste. Many heterophase reactions including, in particular, heterophase polymerizations are carried out in an environmentally friendly dispersion medium such as water. To prevent, inter alia, the formation of waste-water, gases liquefied under high pressure or gases in the supercritical state at temperatures and pressures above the corresponding critical parameters have recently also been used as dispersion medium as alternatives to water.

A frequently employed solvent and/or dispersion medium is carbon dioxide in the liquid or supercritical state (D.A. Canelas, J. M. DeSimone: Adv. Polym. Sci. 133 (1997) 103). The supercritical state of carbon dioxide can be achieved without an excessively high engineering effort. The values for the critical point are $T_{crit}(CO_2)=31.1°$ C. and $p_{crit}(CO_2)=73.8$ bar. The supercritical state of carbon dioxide is characterized by a very low viscosity and a readily variable density, by means of which the solvent properties of the carbon dioxide can also be varied. Reviews of polymerization processes in liquid and supercritical carbon dioxide may be found in A. I. Cooper, J. M. DeSimone: Curr. Opin. Solid State Mater. Sci. 1 (1996) 6. The separation of the polymer from the supercritical fluid can be carried out by means of separation processes which are known in principle (e.g. EP-B 159021).

SUMMARY OF THE INVENTION

It is an object of the present invention to provide a process and an apparatus for heterophase reactions, in particular, for dispersion polymerizations in a liquid or supercritical carbon dioxide, which offers the possibility of carrying out the reactions continuously, semi-continuously or batchwise and the possibility of concentrating the reaction product and re-using unreacted starting materials.

The invention provides a process for heterophase reactions in a liquid or supercritical dispersion medium, in which the starting materials are introduced into the reaction zone of a reactor provided with one or more enrichment zones and the reaction product or unreacted starting material or both starting material and reaction product are discharged via one enrichment zone in each case, wherein a) the reaction product together with the dispersion medium is discharged from the reactor via an enrichment zone, the reaction product is separated off and the dispersion medium is, if desired, in countercurrent to the reaction product/dispersion medium mixture and via an enrichment zone, returned to the reaction zone, or b) unreacted starting material together with the dispersion medium is discharged, the starting material is separated from the dispersion medium and returned directly to the reaction zone and the dispersion medium is, if desired in countercurrent to the reaction product/dispersion medium mixture and via an enrichment zone, returned to the reaction zone, or the steps a) and b) are combined with one another.

DESCRIPTION OF THE PREFERRED EMBODIMENTS

Figure 1:
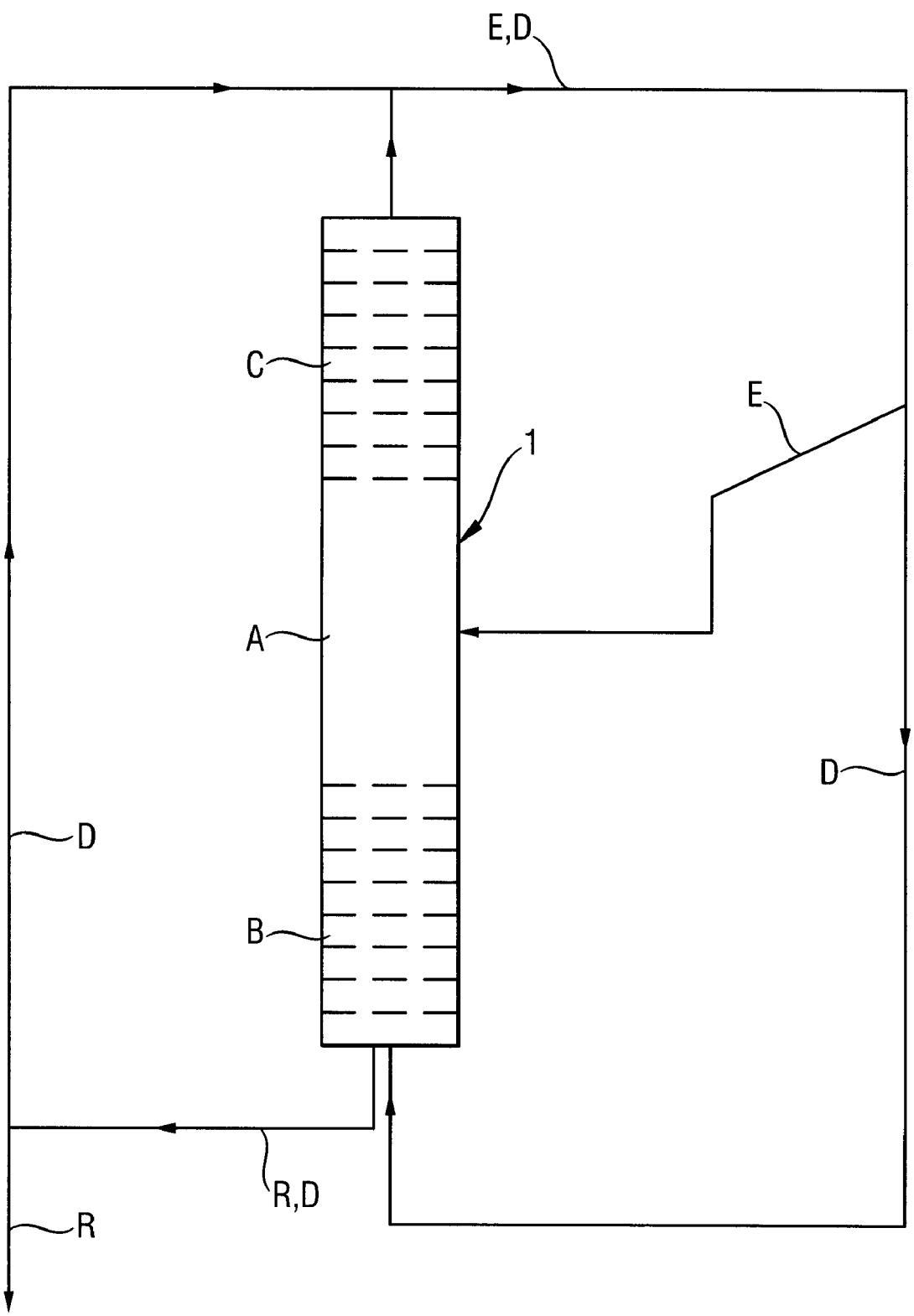
FIG. 1 is a flow diagram of the preferred process.

The process is suitable for carrying out any heterophase reaction. Preference is given to precipitation reactions, crystallizations and, particularly preferably, heterophase polymerizations. Greatest preference is given to the dispersion-polymerization of ethylenically unsaturated monomers in liquid or supercritical carbon dioxide.

The most preferred dispersion polymerization can be carried out either in the liquid state of the dispersion medium carbon dioxide or in the supercritical state of the dispersion medium carbon dioxide. The values for the triple point of carbon dioxide are $T_{trip}(CO_2)=-56.6°$ C. and $p_{trip}(CO_2)=5.2$ bar. The liquid state can be achieved at pressures greater than 5.2 bar and temperatures below the phase boundary curve between the triple point and the critical point. The values for the critical point are $T_{crit}(CO_2)=-31.1°$ C. and $p_{crit}(CO_2)=73.8$ bar.

At pressures and temperatures greater than the critical values, the carbon dioxide is present in a supercritical state. The polymerizations are preferably carried out in the pressure range from 74 to 600 bar. The preferred polymerization temperatures are in the range from 31° C. to 200° C. The carbon dioxide is used in an amount of from 0.5 to 2000 parts by weight of $CO_2$, preferably from 10 to 600 parts by weight of $CO_2$, in each case based on the total weight of the monomers.

As monomers for the dispersion polymerization in carbon dioxide, it is possible to use all free-radically polymerizable, ethylenically unsaturated monomers. Examples of such monomers are vinyl esters of unbranched or branched carboxylic acids having from 1 to 18 carbon atoms, esters of acrylic acid and methacrylic acid with unbranched or branched alcohols having from 1 to 18 carbon atoms, $\alpha,\beta$-monoethylenically unsaturated monocarboxylic and dicarboxylic acids and their amides, vinylaromatics, vinyl (idene) chloride and olefins. The polymerization is carried out in a known manner in the presence of free-radical initiators and, if desired, stabilizers. A review of dispersion polymerization in carbon dioxide is provided by D. A. Canelas, J. M. DeSimone in Adv. Polym. Sci. 133 (1997) 103.

In the process of the invention, the starting materials are introduced separately or as a mixture into the reaction zone of the reactor and are reacted under the appropriate reaction conditions, with or without stirring. Since the heterophase reaction should occur mainly in the reaction zone, the starting materials are preferably metered directly into the reaction zone.

A preferred procedure is to introduce the dispersion medium, preferably carbon dioxide, into the reactor at the end of the enrichment zone for the reaction product and preferably, to convey it through the enrichment zone in countercurrent to the reaction product being discharged. To stir the reaction mixture in the reaction zone and in the enrichment zones, it is possible to use all suitable stirring devices known per se, for example propeller stirrers, pitched blade stirrers, helical stirrers, disk stirrers, impellers or interference flow stirrers.

As reactors, it is possible to use all configurations of cylindrical stirred reactors which are known per se. If the heterophase reaction is carried out under superatmospheric pressure, the reactors must have a corresponding pressure rating. The reaction zone of the reactor is followed by one or more, preferably, two enrichment zones in which the reaction product and/or the unreacted starting material are/is concentrated and separated.

In a particularly preferred embodiment, the reaction zone is located in the middle region of a vertically aligned reactor. Furthermore, it is preferred that the enrichment zones for unreacted starting material and for the reaction product each directly adjoin this reaction zone, in particular, at the opposite ends of the reaction zone. Preferably, unreacted starting material is concentrated in an enrichment zone in the upper part of the reactor and the reaction product is concentrated in an enrichment zone in the lower part of the reactor in order to exploit density differences of the materials in the enrichment process.

The enrichment zones each comprise one or more filter plates arranged sequentially, preferably, above one another. In general, one enrichment zone is divided into the appropriate number of separation zones by means of from 1 to 50, preferably from 3 to 10, filter plates. To effect the separation, the reaction product and a possibly unreacted starting material is/are conveyed continuously, or discontinuously, from the reaction zone into the enrichment zone. The transport of the reaction mixture out of the reaction zone and into the enrichment zones and likewise the transport through the enrichment zones is effected by means of centrifugal pumps which are integrated into the filter plates.

Apart from transport of the reaction mixture from one separation zone into the next adjacent separation zone, the centrifugal pumps also generate a pressure difference between the individual separation zones, with the pressure increasing discontinuously, i.e. stepwise, with increasing distance from the reaction zone. To generate a sufficiently large pressure difference between the individual separation zones in the enrichment zones by means of centrifugal pumps, rotational speeds of from 20 to 3000 revolutions per minute, preferably from 100 to 1000 revolutions per minute, are necessary. Due to their configurations, the centrifugal pumps in the individual separation zones simultaneously serve as stirring elements.

The dispersed reaction product is gradually concentrated in the dispersion medium in the individual separation stages and is discharged at the end of the enrichment zone; the compensation backflow back into the previous separation zone as a result of the pressure gradient effects the stepwise concentration of the reaction product or unreacted starting material from separation stage to separation stage. Possible filter materials for separating the reaction product or starting material from the compensation stream in the separation zones are, for example, woven wire meshes, filters made of ceramic or sintered materials, nonwovens or metal membrane filters. To increase the effective filter area, it is also possible to use filter cartridges. Dispersion medium can be made to flow directly into the filters by means of the centrifugal pumps in order to prevent deposition of reaction product on the filter surface.

The centrifugal pumps simultaneously act as stirring elements for mixing the reaction medium within a separation zone, but can also be provided directly with additional stirring devices such as paddle stirrers. Apart from the transport and the stepwise concentration of reaction components in the individual separation zones, the reaction itself proceeds in these zones. The centrifugal pumps convey the reaction mixture and thus, at the same time, generate a pressure difference between the individual separation zones and between the reaction zone and the directly adjacent separation zones. The compensation backflow occurs via the separation filters in the filter plates. Here, the separation filters prevent transfer of dispersed reaction product which has already been formed into the next zone. Only carbon dioxide and unreacted starting materials dissolved molecularly in the carbon dioxide and molecularly dissolved reaction products below the phase separation concentration can pass through the separation filters. As a result, the reaction product is concentrated stepwise from separation zone to separation zone in the direction of the bottom of the reactor, while the unreacted starting materials of the reaction are similarly concentrated at the- upper end of the reactor.

The reaction product dispersed in the dispersion medium is discharged via the enrichment zone and the reaction product gradually concentrates in the dispersion medium in the individual separation stages. In countercurrent, the dispersion medium is returned to the reaction zone via the enrichment zone. As a consequence of this countercurrent flow of dispersion medium, in particular of pure carbon dioxide, the reaction product formed is pre-purified stepwise by extraction during transport through the separation zones to the end of the enrichment zone before being discharged from the reactor. The pure carbon dioxide is therefore preferably introduced into the bottommost separation zone of the enrichment zone for the reaction product. In this zone, the extracted reaction product is also discharged from the reactor and, for example, separated off in a separate container by de-pressurization of the carbon dioxide.

In the preferred embodiment, an enrichment zone for unreacted starting material is located at the end of the reaction zone opposite to the enrichment zone for the reaction product. The unreacted starting material dispersed in the dispersion medium is discharged via the enrichment zone and is separated stepwise from the dispersion medium in the individual separation stages. All or some of the unreacted starting material is returned to the reactor. The dispersion medium is circulated in the described way, namely by introduction into the enrichment zone for reaction product.

In one preferred embodiment, the reaction product which has been discharged from the main reaction zone by diffusion through the filter owing to a small particle size or has been formed in the enrichment zone for unreacted starting material, is returned to the main reaction zone in countercurrent via the enrichment zone for unreacted starting material.

Apart from the embodiment described, the reactor can also be operated with only one enrichment zone, either for unreacted starting materials or for the reaction product in addition to the reaction zone. The reactor can be operated continuously or batchwise, preferably continuously.

As the metering and pumping equipment for the metering-in of starting materials and for the carbon dioxide circuit, use is made of equipment known per se, for example, high-pressure displacement pumps. For the necessary measurement and control functions described in the example, use is made of measurement and control devices of a type and design known per se. The separation of the reaction product and the separation and purification of the unreacted starting materials and the purification of the dispersion medium to be re-used are carried out in a manner known per se using suitable apparatus and plants, for example, by means of depressurization or stripping.

The invention is illustrated by way of example with the aid of the drawings below, without the above being restricted in any way:

FIG. 1 shows a flow diagram of the preferred process procedure:

the heterophase reaction is carried out in a reactor (1) having a reaction zone (A), an enrichment zone (B) for the reaction product (R) in the lower part of the reactor (1) and an enrichment zone (C) for unreacted starting material (E) in the upper part of the reactor (1). The mixture of starting material (E) and dispersion medium (D) is discharged via the upper enrichment zone (C), the starting material (E) is separated off and returned to the reaction zone (A). The dispersion medium (D) is circulated and returned to the reaction zone (A) via the lower enrichment zone (B) in countercurrent to the mixture of reaction product (R) and dispersion medium (D) exiting there. The reaction product (R) is isolated and the dispersion medium (D) is circulated and returned to the reaction zone (A) via the upper enrichment zone (C) in countercurrent to the mixture of starting material (E) and dispersion medium (D) exiting there.

Figure 2:
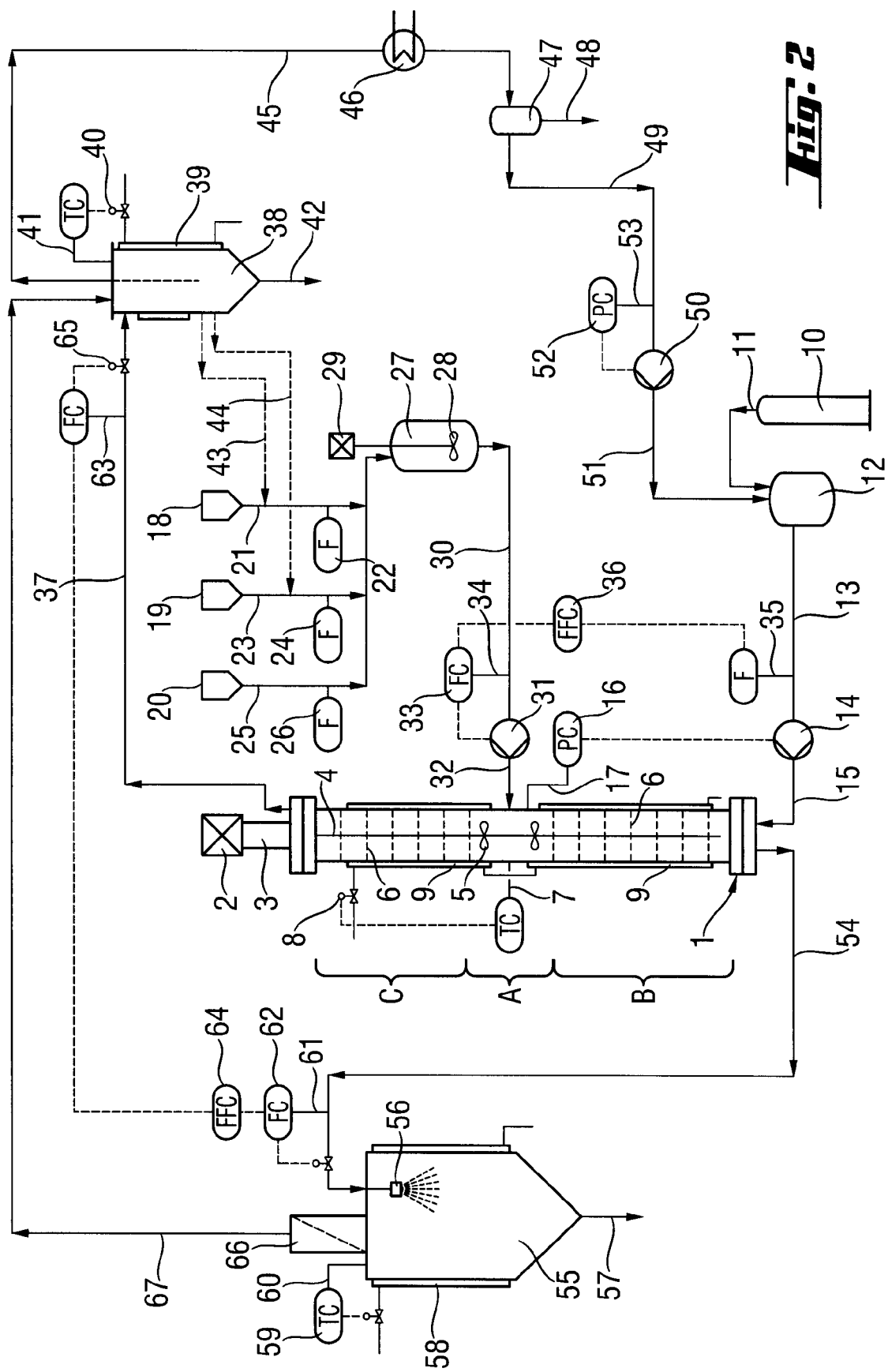
FIG. 2 is a flow diagram of the process for continuous dispersion polymerization in carbon dioxide.

FIG. 2 shows a flow diagram of the plant according to the invention for continuous dispersion polymerization in carbon dioxide.

The reactor (1) in FIG. 2 comprises a main reaction zone (A), an enrichment zone (B) for the reaction product and an enrichment zone (C) for unreacted starting materials. A motor (2) drives, via a pressure-rated coupling (3), the reactor shaft (4) to which various stirring and conveying elements are fitted in the various reaction zones. In the main reaction zone (A), stirrers (5) ensure sufficient mixing of the reaction components. The enrichment zones (B) and (C) are divided further into individual separation zones by means of filter plates (6). A temperature sensor (7) measures the temperature in the main reaction zone (A) and provides the basis for the control (8) of the temperature in the heating jacket (9) of the reactor (1).

Carbon dioxide from an external supply container (10) is conveyed at a pressure of about 60 bar through a line (11) into a reservoir (12). From this reservoir (12), the carbon dioxide goes via a line (13) to a compressor (14) and from there via a line (15) into the enrichment zone (B) of the reactor (1), preferably into the bottommost separation zone of the enrichment zone (B). The outlet pressure of the compressor (14) is controlled using the control element (16) on the basis of the pressure in the main reaction zone (A) which is measured by means of a pressure sensor (17).

The starting materials are conveyed from a monomer reservoir (18), a stabilizer reservoir (19) and an initiator reservoir (20) via a monomer line (21) with flow control (22), a stabilizer line (23) with flow control (24) and an initiator line (25) with flow control (26) into a reservoir for starting materials (27) containing a stirring element (28) which is driven by a motor (29). The starting mixture is conveyed via a line (30) to a pump (31) from which it is metered via a line (32) into the main reaction zone (A) of the reactor (1). The control element (33) controls the metering of the starting materials on the basis of the flow measurement (34) of the starting materials in line (30) and the flow measurement by means of control element (35) of the carbon dioxide in line (13), the two of which are coupled to one another by means of a ratio regulator (36).

Unreacted starting materials and carbon dioxide are taken continuously from the uppermost separation zone of the enrichment zone (C) and conveyed via a line (37) to a de-pressurization and separation vessel (38) where the mixture is de-pressurized to a pressure below the liquid pressure of carbon dioxide. To prevent icing of the de-pressurization and separation vessel (38) as a result of the de-pressurization, the vessel is provided with a heating jacket (39). The temperature of the liquid in the heating jacket (39) is controlled by means of the regulator (40) on the basis of a temperature measurement by a sensor (41) in the de-pressurization and separation vessel (38).

The unreacted starting materials separated in the de-pressurization of the carbon dioxide in the de-pressurization and separation vessel (38) are continuously or discontinuously discharged from this vessel via line (42). Unreacted monomers and stabilizer which has not been consumed can, if desired after an external separation and purification procedure, be returned via feed lines (43, 44) into the monomer line (21) and stabilizer line (23), respectively.

The carbon dioxide under gas pressure which is, in particular, still contaminated with monomer residues, is conveyed from the de-pressurization and separation vessel (38) via a line (45) and a heat exchanger (46) into a separation and purification vessel (47) in which the monomer residues are removed from the carbon dioxide and are discharged via line (48). The purified carbon dioxide goes via a line (49) to a compressor (50) where it is compressed to the pressure of the carbon dioxide reservoir (12). The compressor (50) and the carbon dioxide reservoir (12) are connected to one another via a line (51). The power of the compressor (50) is controlled by means of the regulator (52) on the basis of the gas pressure of the purified carbon dioxide which is measured using a pressure sensor (53) in the line (49).

At the bottommost separation zone of the enrichment zone (B), the pre-purified reaction product is discharged continuously or discontinuously from the reactor (1) and is transported via a line (54) to a de-pressurization and collection vessel (55) for the reaction product. The reaction product dispersed in the carbon dioxide is separated from the carbon dioxide by de-pressurization, through a spray device (56) in the de-pressurization and collection vessel (55) and is discharged continuously or discontinuously from the de-pressurization and collection vessel (55) via line (57).

In order to prevent icing of the de-pressurization and collection vessel (55) as a result of the de-pressurization of the carbon dioxide, this vessel is provided with a heating jacket (58). The temperature of the liquid in the heating jacket (58) is controlled by means of a control element (59) on the basis of a temperature measurement by a sensor (60) in the depressurization and collection vessel (55).

The product flow in line (54) is measured using a flow meter (61). The product flow is controlled by means of the regulator (62) in line (54) on the basis of the flow measurement by the sensor (61) in line (54) and the flow measurement by the sensor (63) in line (37), which are coupled to one another by means of the ratio regulator (64). In this way, the flow of the carbon dioxide with the unreacted starting materials in line (37) is also controlled by means of the control element (65).

The sum of the flows introduced into the reactor via lines (15) and (32) is equal to the sum of the flows leaving the reactor via lines (37) and (54). Steady-state reaction conditions are ensured with the aid of the reactor pressure required for the reaction, which is measured by means of the pressure sensor (17) and employed as the basis of the control (16) of the carbon dioxide compressor (14).

The carbon dioxide which has been de-pressurized to gas pressure is conveyed from the de-pressurization and collection vessel (55) via a filter (66) to separate off residual product and a line (67) to the de-pressurization and separation vessel (38) and thus returned to the carbon dioxide circuit.

Figure 3A:
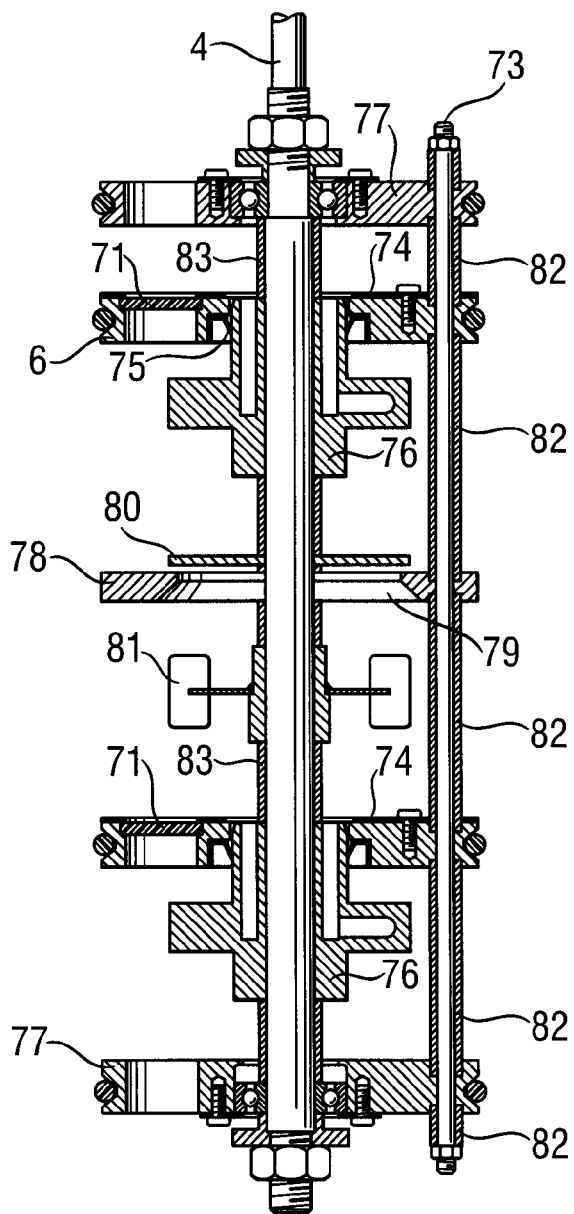
FIG. 3 depicts the arrangement of the separation zones in the enrichment zones of the reactor.
Figure 3B:
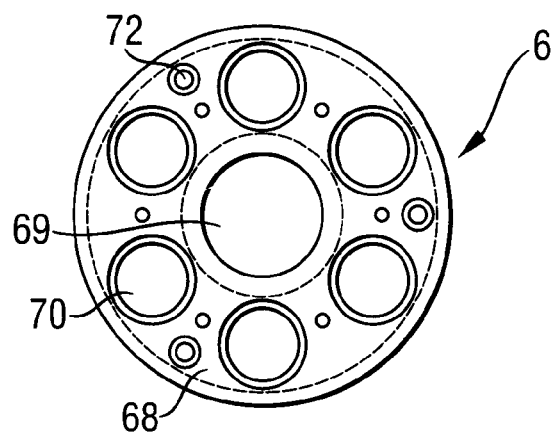

FIG. 3 shows the arrangement of the separation zones in the enrichment zones of the reactor:

The filter plates (6) in the enrichment zones (B) and (C) of the reactor (1) shown in FIG. 3 comprise a circular base plate (68) having a shaft orifice (69) for the reactor shaft (4), six filter openings (70) for the separation filters (71) and three openings (72) for the support rods (73). The separation filters (71) are fixed to the base plate by means of a cover plate (74). A sliding ring seal or radial seal (75) seals the base plate from the centrifugal pump (76) which is fitted to the reactor shaft (4) and rotates with the shaft.

Within the bottommost separation zone of the enrichment zone (B) and within the uppermost separation zone of the enrichment zone (C), a circular support plate (77) is installed in the reactor and this has the function both of guiding the reactor shaft (4) at the top and bottom and also fixing the support rods (73) at the top and bottom. The support plate has an appearance comparable to the base plate of the filter plate with six openings for material transport at the point where the filter openings in the filter plate are located.

If desired, the individual separation zones can also be divided by additional fixed separation plates (78) which possess a central opening (79) and by dividing disks (80) which rotate with the reactor shaft (4) in order to avoid excessive mixing within the separation zones. As an alternative, it is also possible for additional stirring devices, for example paddle stirrers (81) which are fixed to the reactor shaft (4), to be installed in the individual separation zones in order to achieve better mixing.

The spacing of the filter plates (6) from one another and the spacings of the support plates (77) and separation plates (78) can be made variable. For this purpose, spacer tubes (82) are pushed over the support rods (73) and corresponding spacer tubes (83) are also pushed over the reactor shaft (4). The spacer tubes (83) additionally serve to position the dividing disks (80) and the additional stirring devices (81).

We claim:

1. A process for heterophase reactions in a liquid or supercritical dispersion medium, in which the starting materials are introduced into the reaction zone of a reactor provided with one or more enrichment zones and the reaction product or unreacted starting material or both starting material and reaction product, are discharged via one enrichment zone in each case, wherein a) the reaction product together with the dispersion medium is discharged from the reactor via an enrichment zone, the reaction product is separated off and the dispersion medium is, optimally in countercurrent to the reaction product/dispersion medium mixture and via the same or an other enrichment zone, returned to the reaction zone, or b) unreacted starting material together with the dispersion medium is discharged, the starting material is separated from the dispersion medium and returned directly to the reaction zone and the dispersion medium is, optimally in countercurrent to the reaction product/dispersion medium mixture and via an enrichment zone, returned to the reaction zone, or the steps a) and b) are combined with one another, wherein successive enrichment zones are separated by a filter plate.

2. The process as claimed in claim 1, wherein a) the reaction product together with the dispersion medium is discharged from the reactor via an enrichment zone, the reaction product -is separated off and the dispersion medium is returned to the reactor in countercurrent to the starting material/dispersion medium mixture, and b) unreacted starting material is discharged together with the dispersion medium, the starting material is separated from the dispersion medium and returned directly to the reaction zone and the dispersion medium is returned to the reaction zone via an enrichment zone.

3. The process as claimed in claim 1, wherein the ethylenically unsaturated monomers are polymerized in liquid or supercritical carbon dioxide by means of a dispersion polymerization.

* * * * *